(12) United States Patent
Henderson (10) Patent No.: US 6,306,235 B1
(45) Date of Patent: *Oct. 23, 2001

(54) SPIRAL FORMED PRODUCTS AND METHOD OF MANUFACTURE

(75) Inventor: Randal Henderson, Franklinton, NC (US)

(73) Assignee: Nomaco, Inc., Zebulon, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,508

(22) Filed: Sep. 15, 1998

Related U.S. Application Data (60) Provisional application No. 60/061,985, filed on Oct. 16, 1997.

(51) Int. Cl.[7] .......................... B29C 31/00; B29C 31/08; B29C 39/14
(52) U.S. Cl. .......................... 156/195; 156/193; 156/426; 156/428; 156/446
(58) Field of Search .................................. 156/193, 194, 156/195, 192, 244.11, 250, 244.18, 244.19, 425, 426, 428, 429, 446, 443

(56) References Cited

U.S. PATENT DOCUMENTS

| | | |
|---|---|---|
| 1,519,522 | 12/1924 | Weigel . |
| 2,442,946 | 6/1948 | Barton . |
| 3,083,131 | 3/1963 | Wentz . |
| 3,413,388 | * 11/1968 | Lux et al. . |
| 3,436,290 | 4/1969 | Reissner . |
| 3,943,224 | 3/1976 | Drostholm . |
| 3,954,929 | * 5/1976 | Hoenke . |
| 3,984,271 | 10/1976 | Gilbu . |
| 3,988,190 | * 10/1976 | McWilliams ........................ 156/145 |
| 4,118,814 | 10/1978 | Holtom . |
| 4,343,672 | * 8/1982 | Kanao .................................. 156/428 |
| 4,353,763 | 10/1982 | Simons . |
| 4,362,187 | * 12/1982 | Harris et al. ......................... 138/109 |
| 4,415,392 | 11/1983 | Komori . |
| 4,459,168 | 7/1984 | Anselm . |
| 4,466,854 | 8/1984 | Hawerkamp . |
| 4,613,389 | 9/1986 | Tanaka . |
| 4,783,230 | 11/1988 | Perkins . |
| 4,826,423 | 5/1989 | Kemp et al. . |
| 4,968,368 | 11/1990 | Moody . |
| 5,261,988 | 11/1993 | Dikis et al. . |

(List continued on next page.)

FOREIGN PATENT DOCUMENTS

| | | |
|---|---|---|
| 626945 | 7/1949 | (GB) . |
| 85258 | 6/1957 | (NL) . |

*Primary Examiner*—Mark A. Osele
*Assistant Examiner*—Sue A. Purvis
(74) *Attorney, Agent, or Firm*—Melvin I. Stoltz (57) ABSTRACT

In the present invention, hollow thermoplastic foam tubes of any desired diameter are easily achieved as well as large sheets or planks of thermoplastic foam material in any width and thickness desired by spirally wrapping and fusing a thermoplastic foam profile having a desired size and shape. By employing a thermoplastic foam extruder to produce a profile having a desired cross-sectional shape or configuration, and advancing the profile onto a rotating support member for being wrapped peripherally surrounding the rotating support and continuously bonding the abutting edges of the profile as the profile is spirally wound, a unique spiral forming and product manufacturing procedure and system is realized. By employing this unique spiral forming process, a hollow cylindrical thermoplastic foam tube is formed on a continuous basis, with the length thereof being controlled only by the needs of the customer. In addition, any desired diameter can be formed, by employing a rotating support having the desired diameter, with the thickness of the tube being controlled by the thickness of the profile formed by the extrusion equipment.

29 Claims, 6 Drawing Sheets

U.S. PATENT DOCUMENTS

| | | |
|---|---|---|
| 5,358,580 | 10/1994 | Miyamura et al. . |
| 5,382,399 * | 1/1995 | Moret De Rocheprise et al. ..... 264/127 |
| 5,396,755 * | 3/1995 | Arnold ............................... 56/16.4 B |
| 5,411,619 | 5/1995 | Sundqvist et al. . |
| 5,468,207 * | 11/1995 | Bower et al. ........................ 493/297 |
| 5,476,562 | 12/1995 | Inhofe, Jr. . |
| 5,480,505 * | 1/1996 | Andre ................................... 156/201 |
| 5,586,963 * | 12/1996 | Lennon et al. ....................... 493/299 |
| 5,591,292 | 1/1997 | Blomqvist . |
| 5,637,168 * | 6/1997 | Carlson ................................ 156/143 |

\* cited by examiner

SPIRAL FORMED PRODUCTS AND METHOD OF MANUFACTURE

RELATED APPLICATIONS

This application is related to U.S. Provisional Patent Application Ser. No. 60/061,985, filed Oct. 16, 1997 entitled SPIRAL FORMED PRODUCTS AND METHOD OF MANUFACTURE.

TECHNICAL FIELD

This invention relates to foamed thermoplastic products and methods for manufacture and, more particularly, to foamed thermoplastic products manufactured by continuous formation in a substantially cylindrical configuration.

BACKGROUND ART

During the last few decades, substantial effort has been expended and interest has developed in the formation and construction of products using foamed thermoplastic materials. Typically, these products are formed either by foamed extrusion or molding. However, regardless of which method is employed, production limitations exist on the size and shape in which products can be efficiently produced at competitive prices.

One example of the type of products produced using the extrusion process is the creation of hollow elongated cylindrical tubes formed from foamed thermoplastic material. These tubes are used in a wide variety of products, most typically as insulation for fluid carrying pipes or conduits.

Although the extrusion manufacturing process for forming foamed cylindrically shaped thermoplastic tubes has progressed over the years to an extremely efficient production system, tube diameters greater than about seven inches are incapable of being produced on conventional equipment. Even though a substantial market exists for large diameter tubes formed of thermoplastic material, this demand cannot be satisfied using conventional extrusion equipment. Large diameter foam tubes require manufacturers to invest in the purchase of extremely expensive manufacturing equipment, before this demand can be met using current technology.

In view of the substantial investment that must be made by manufacturing companies in obtaining equipment for satisfying the industry needs for larger diameter cylindrical tube members, the products produced to meet this demand are extremely expensive, when compared to the conventional price for smaller diameter thermoplastic tubes. However, in spite of the demand for such products and the industry desire for competitive prices, prior art technology has failed to provide a manufacturing method capable of producing large diameter cylindrical tubes in a cost effective, price competitive manner.

In addition to the industry demands for larger diameter, hollow, cylindrical tubes, substantial demand also exists for foamed thermoplastic material formed in large sheet form in a wide range of thicknesses. Generally, conventional extrusion equipment for forming foamed thermoplastic products is incapable of producing foamed polymer sheets having widths greater than about 12" with a thickness of about ½". Consequently, the demand for large width foam plastic sheet is incapable of being satisfied by conventional manufacturers. In order to satisfy the industry needs for this product, extremely expensive, custom designed equipment must be purchased, causing the large width foam sheet products produced thereby to be more costly. In addition, the return of capital for this investment is low.

Although the specialized manufacturers who own this expensive equipment are capable of producing foamed thermoplastic sheet material in large width configurations, these manufacturers are still limited in the thickness that can be produced in a single sheet. Typically, these prior art sheet extruders are capable of producing sheet material having a maximum thickness of ½".

Consequently, any customer desiring to have a final product thicker than ½", is required to have the product produced by employing a plurality of sheets which are cut to size and integrally bonded to each other in order to build up a final product to the desired thickness. As a result, additional manufacturing and handling expenses are incurred and the final product produced by these specialized procedures is substantially increased in cost.

In order to produce plank material in thicknesses greater than ½", a plurality of sheets must be laminated or bonded together in secondary processes, increasing the thickness of the profile by ½" with each process. Such lamination steps substantially increase the complexity of the manufacturing procedures as well as increasing the overall scrap rates.

In an attempt to enable plank material to be produced in thicknesses greater than ½", accumulators have been constructed and used with extruders. By employing an extruder/accumulator combination, the foamed plastic is transferred directly from the extruder in the accumulators until the accumulator is filled. Then, using a piston or ram, the accumulated plastic is forced out of the accumulator. Using this system, planks with thicknesses up to 2" can be achieved. However, this process is inefficient, since it must be run intermittently and cannot be operated continuously. Furthermore, a high scrap rate is obtained due to the intermittent stop/start process.

As is evident from these systems, in spite of the demand for improved manufacturing techniques, no effective prior art manufacturing system has been developed for reducing the costs involved.

Consequently, it is a principal object of the present invention to provide a method for manufacturing large diameter foam tubes and foam plastic sheet material, using a production method which is easily achieved, highly effective, and comparatively inexpensive.

Another object of the present invention is to provide a new manufacturing process having the characteristic features described above which enables larger diameter hollow cylindrical tubes and large foam sheet material to be produced in an extremely cost efficient manner.

Another object of the present invention is to provide a new manufacturing process having the characteristic features described above which is capable of being employed with minimum of manpower and optimum production rates.

Other and more specific objects will in part be obvious and will in part appear hereinafter.

SUMMARY OF THE INVENTION

By employing the present invention, all of the difficulties and drawbacks found in prior art systems are eliminated and hollow thermoplastic foam tubes of any desired diameter are easily achieved as well as large sheets or planks of thermoplastic foam material in any width and thickness desired. In the present invention, all of the complex, expensive equipment previously required to satisfy industry needs for these products are eliminated and an easily employed, unique manufacturing process is used.

In accordance with the present invention, a thermoplastic foam extrusion system is employed to produce a profile having any desired cross-sectional shape or configuration, with the profile being advanced onto a rotating cylindrical sleeve. As the foam profile is wrapped peripherally surrounding the rotating sleeve, the abutting edges of the profile are continuously fused to each other in a spiral forming, manufacturing operation. In its preferred embodiment, the elongated extruded thermoplastic profile is advanced onto the rotating cylindrical sleeve at any desired angle which enables the profile to be continuously, longitudinally advanced along the length of the sleeve as the side edge of the incoming profile is bonded to the edge of the adjacent, wrapped profile in a generally continuous, spiral forming manner.

By employing this unique spiral forming process, a hollow cylindrical thermoplastic foam tube is formed on a continuous basis, with the length thereof being controlled only by the need of the customer. In addition, any desired diameter can be formed by employing a rotating sleeve having the internal diameter desired for the product. Both the thickness and outer diameter of the tube is controlled by the thickness of the profile formed by the extrusion equipment.

As is evident from this disclosure, a highly efficient, low-cost manufacturing process is realized which is capable of producing hollow cylindrical tubes formed of thermoplastic foam material with the tube comprising any desired thickness and any desired diameter. Furthermore, by cutting the elongated formed tube at any desired length, products are produced to the precise specification desired by the customer.

In addition to providing a hollow cylindrically shaped, elongated foam plastic tube having any desired diameter, wall thickness, and length sought by a customer, the process of the present invention also achieves a hollow cylindrical tube member having any cross-sectional shape, configuration, or aperture pattern desired by a customer. As is well known in the art, expanded foam plastic extrusions may be formed with any desired cross-sectional shape, overall configuration, aperture pattern and the like as part of the formation process. Consequently, by employing these known formation techniques in combination with the spiral forming process of the present invention, cylindrical tubes may be formed incorporating a particularly desired pattern or configuration. In this way, enhanced flexibility and product design capabilities far beyond current manufacturing techniques are attained by employing the present invention.

A further feature provided by the unique manufacturing process of the present invention is the ability to produce cylindrically shaped hollow tubes having any desired wall thickness, diameter, and overall configuration along with the further ability to provide said hollow cylindrical tube members incorporating two or more layers integrally bonded to each other. By employing conventional techniques, such as co-extrusion, cross-head extrusion, or in-line bonding or fusing, one or more layers of additional material can be bonded to the initial extruded layer of foam plastic emanating from the extrusion equipment.

Once the additional layer or layers of material have been bonded to the base layer or profile, as desired, the multi-layer profile is advanced onto the spiral forming manufacturing equipment of the present invention. In this way, the precise multi-layered, hollow, cylindrical component sought by the customer is attained in any desired diameter and thickness. By employing this technique, substantially enhanced speed and production capabilities are realized as well as the attainment of products which had previously been unattainable using conventional, known manufacturing techniques.

In addition to providing the uniquely constructed hollow cylindrical tubes detailed above, the spiral forming process of the present invention also provides substantially flat sheets or planks of any desired thermoplastic material. It has been found that by initially forming a cylindrical tube in the manner detailed above and then longitudinally cutting or slitting the wall of the tube, the spiral formed material opens into a substantially flat sheet or plank of foamed thermoplastic material.

By employing this manufacturing process, large width thermoplastic foam sheets or planks are formed with any desired thickness or configuration, eliminating the expensive prior art multi-step operations or the use of extruders and accumulators, which are required for attaining similar product constructions. Furthermore, the present invention is capable of attaining a flat sheet or plank of thermoplastic material which is formed in any configuration or pattern required by a consumer. In addition to these features, the present invention also achieves an easily produced, comparatively inexpensive foam thermoplastic sheet or plank member which comprises a plurality of layers of different materials which have been fused or bonded together to form any desired configuration or construction sought by the user.

As detailed above, the present invention attains sheet or plank material formed in a single step with the final product comprising any desired specification sought by the user. As a result, the entire sheet or plank manufacturing industry is revolutionized by this invention with the final product being attained using conventional extrusion equipment. Consequently, costs for producing any desired product are substantially reduced.

As is evident from the foregoing disclosure, the present invention is capable of achieving hollow cylindrical tubes formed of foamed thermoplastic material in any desired diameter and thickness as well as substantially flat sheet or planks of foamed thermoplastic material in any desired thickness, configuration, or visual appearance in a manner which is produced economically, simply, and directly without employing expensive, specially designed equipment. Furthermore, scrap material is reduced, and smaller batches or quantities of material can be manufactured in any color, size, product formulation, etc. desired by a user. Since small quantities can be produced, extensive inventories are eliminated and significant cost reductions are realized.

THE DRAWINGS

For a fuller understanding of the nature and objects of the present invention, reference should be had to the following detailed description, taken in connection with the accompanying drawings, in which.

DETAILED DESCRIPTION

By referring to FIGS. 1–12, along with the following detailed disclosure, the construction of the manufacturing equipment, the process of the present invention, and the uniquely constructed products attainable with the present invention can all be best understood. However, as will become evident from this detailed disclosure, variations may be made in the manufacturing equipment, the method steps, and the resulting products without departing from the scope of this invention. Consequently, the disclosure provided herein, as well as shown in FIGS. 1–12, are intended as examples of the present invention and not as a limitation thereof.

Figure 1:
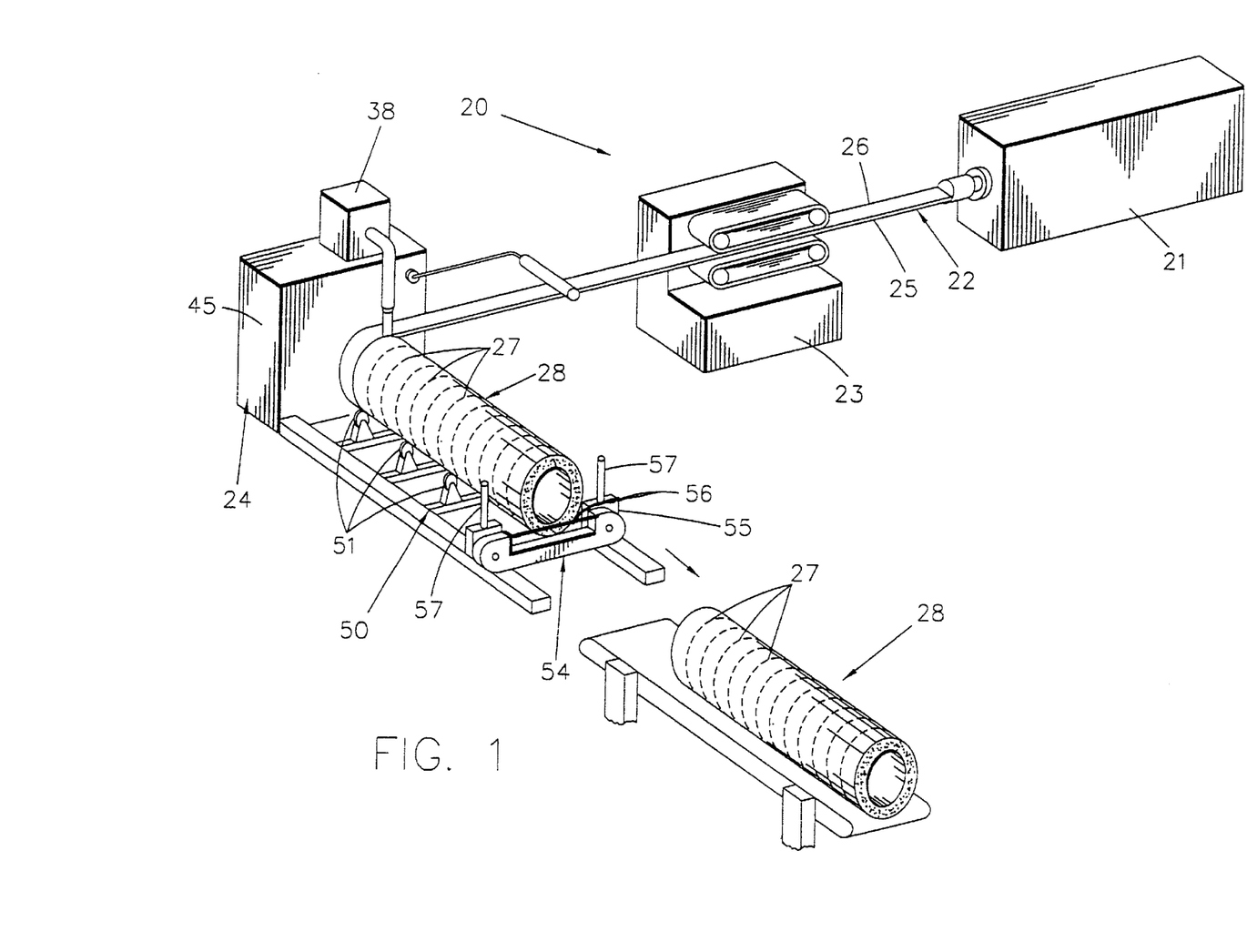
FIG. 1 is a perspective view of the manufacturing equipment employed in producing the spiral formed cylindrical tubes in accordance with the present invention.

In FIG. 1, the preferred embodiment of product forming system 20 of the present invention is fully disclosed. In this embodiment, product forming system 20 comprises an extruder 21, having a generally conventional configuration, which produces foamed thermoplastic profile 22, in any desired configuration, having side edges 25 and 26. Puller 23 is employed for continuously drawing foamed thermoplastic profile 22 from extruder 21 and feeding profile 22 to tube forming machine 24.

In employing this invention, any thermoplastic material can be used to form profile 22. However, the preferred thermoplastic material comprises one or more selected from the group consisting of polystyrenes, polyolefins, polyethylenes, polybutanes, polybutylenes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, and copolymers of polypropylene.

In accordance with the present invention, as shown in FIGS. 1, 2, 4, and 5, tube forming machine 24 is constructed for receiving foam thermoplastic profile 22 on continuously rotating mandrel 30 in a manner which causes profile 22 to be wrapped around rotating mandrel 30 of tube forming machine 24, continuously forming a plurality of spirally wound convolutions 27, in a side-to-side abutting relationship. In this way, the incoming continuous feed of foamed thermoplastic profile 22 is automatically rotated about mandrel 30, in a generally spiral configuration, causing side edge 25 of incoming profile 22 to be brought into abutting contact with side edge 26 of previously received and wrapped convolution 27. By bonding abutting side edges 25 and 26 to each other at this juncture point, substantially cylindrical, hollow tube 28 is formed.

In order to provide integral bonded engagement of side edge 25 of profile 22 with side edge 26 of convolution 27, a bonding or fusion head 31 is employed. If desired, bonding/fusion head 31 may comprise a variety of alternate constructions in order to attain the desired, secure, affixed, bonded interengagement of edge 25 with edge 26. In the preferred embodiment, as depicted in FIGS. 2 and 3, bonding/fusion head 31 employs heated air.

In this preferred embodiment, bonding/fusion head 31 is constructed from heat conductive material and formed as a hollow housing which comprises side surfaces 32 and 33, top surface 34 and edge 35. By delivering heated air to head 31 through portal 36 formed in top surface 34, the temperature of surfaces 32 and 33 of head 31 are elevated to a level which enables the side edges of profile 22 and convolution 27 which contacts head 31 to be raised to their melting point. In addition, in the preferred embodiment, head 31 also comprises apertures 37 formed in edge 35 which delivers a continuous flow of hot air directly to side edges 25 and 26, assuring that the melting temperature is reached and edges 25 and 26 are securely fused or bonded to each other.

Figure 2:
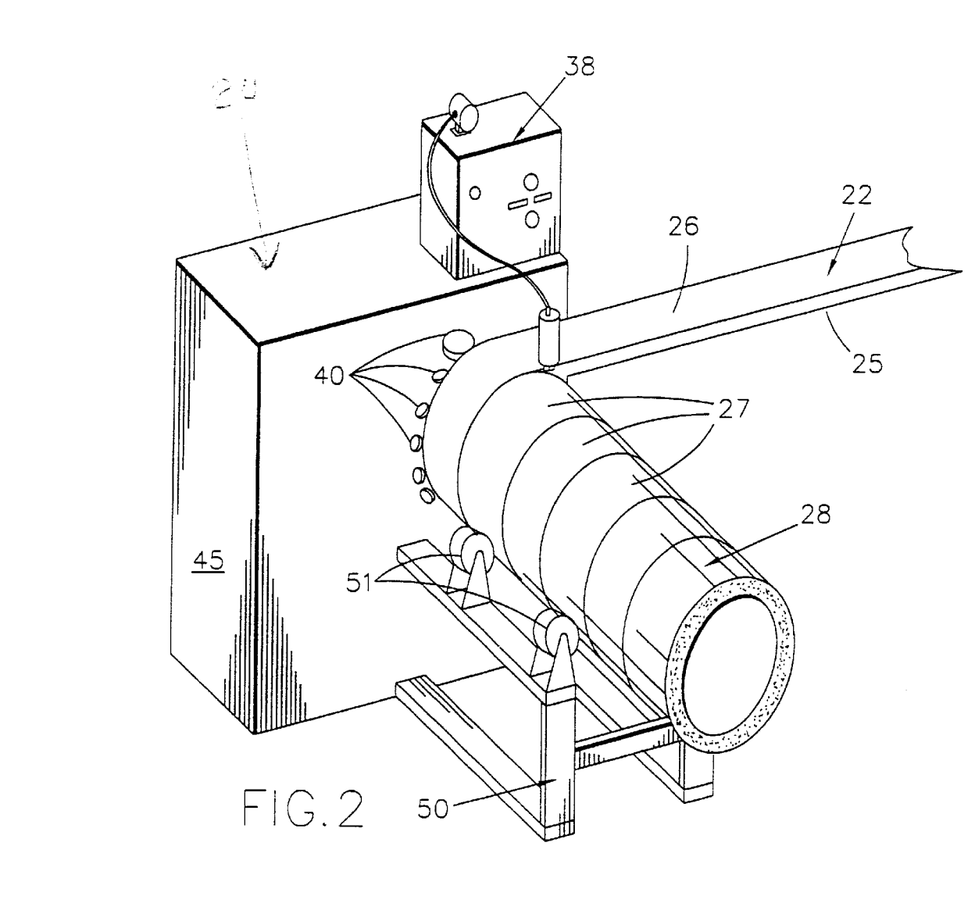
FIG. 2 is a perspective view, greatly enlarged, of one portion of the equipment depicted in FIG. 1 wherein the bonding operation employed to form the hollow tube member of the present invention is depicted.
Figure 3:
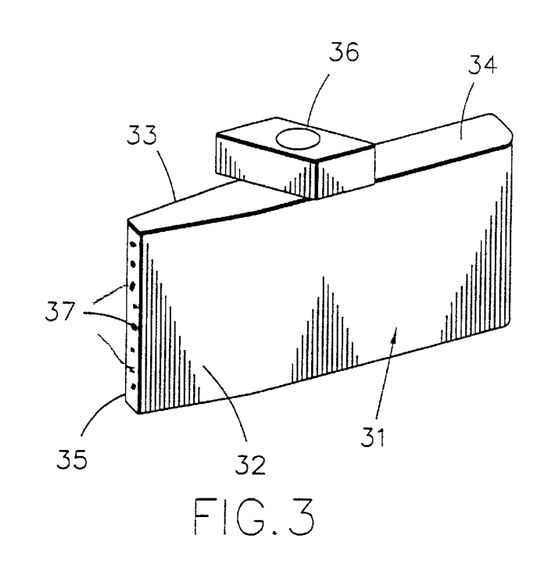
FIG. 3 is a perspective view of the preferred embodiment of the bond forming head employed in the equipment depicted in FIG. 2.

As best seen in FIG. 2, bonding/fusion head 31 is positioned at the juncture zone at which side edge 25 of incoming profile 22 is brought into contact with side edge 26 of the previously received and spiral wrapped convolution 27. By causing bonding/fusion head 31 to simultaneously contact side edge 25 and side edge 26 of these components of profile 22, the temperature of the surfaces is raised to the melting point thereof, enabling the contact of side edge 25 of incoming profile 22 to be brought in direct contact with side edge 26 of first spiral wrapped convolution 27 in a manner which causes the surfaces to be intimately bonded to each other.

In the preferred construction, as depicted in FIGS. 1 and 2, tube forming machine 24 comprises a hot air generator 38, which is connected directly to bonding/fusion head 31 to deliver the desired heated air to bonding/fusion head 31. Although heated air is preferred for this bonding operation, alternate affixation means may be employed without departing from the scope of this invention. One such alternative is the use of heated adhesives applied directly to the side edges.

Tube forming machine 24 also preferably incorporates means for receiving profile 22 as it contacts rotating mandrel 30 and for guiding profile 22 onto mandrel 30 to form convolutions 27. In the embodiment depicted in FIG. 2, a plurality of guide rollers 40 are employed which are constructed with differing diameters to impart the desired position to profile 22 relative to mandrel 30, enabling profile 22 to be advanced onto rotating mandrel 30 in the desired angle to form convolutions 27. In the embodiment of tube forming machine 24 depicted in FIGS. 4 and 5, an arcuately curved camming ramp 41 is employed for receiving the incoming feed of thermoplastic profile 22 and guiding profile 22 onto rotating mandrel 30 in the desired angle to attain convolutions 27.

Figure 4:
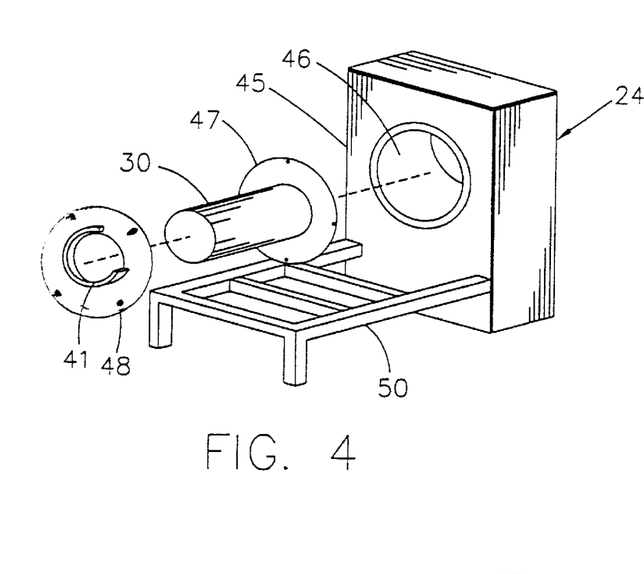
FIG. 4 is an exploded perspective view depicting the rotating mandrel assembly employed in forming the hollow tubes of the present invention.
Figure 5:
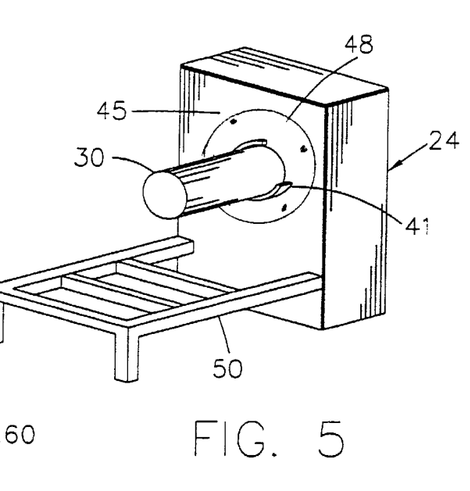
FIG. 5 is a perspective view of the fully assembled rotating mandrel system depicted in FIG. 4.

By referring to FIGS. 1, 2, and 4–6, along with the following detailed discussion, the construction and operation of the preferred embodiment of tube forming machine 24 can best be understood. In this preferred embodiment, tube forming machine 24 comprises support housing 45 which incorporates rotating cylindrical sleeve 46 mounted therein, constructed for continuously rotating about the central axis thereof. In addition, as best seen in FIG. 4, mandrel 30 is integrally interconnected with mounting plate 47, while camming ramp 41 is integrally interconnected with mounting plate 48. In order to provide the desired continuous rotational movement of mandrel 30 relative to stationary camming ramp 41, mounting plate 47 is securely affixed to rotating cylindrical sleeve 46. In addition, mounting plate 48 is fixedly secured to housing 45, thereby securely mounting camming ramp 41 to housing 45 in a stationary position while mandrel 30 is continuously rotated about its central axis due to the continuous rotation of cylindrical sleeve 46.

Tube forming machine 24 also preferably incorporates a support frame 50 mounted in association with rotating mandrel 30 and support housing 45. Although support frame 50 may be constructed in a variety of alternate embodiments, as depicted in the drawings, the purpose of support frame 50 is to be positioned for receiving hollow, cylindrical tube 28 as tube 28 is formed, and provide any support that may be required for holding tube 28 as tube 28 is formed and axially extends away from housing 45.

Although a wide variety of alternate constructions can be employed to assure continuous, guided, supporting control of hollow cylindrical tube 28, as tube 28 is formed by forming machine 24, the preferred components incorporated with support frame 50 include a plurality of rollers 51 which are specifically constructed for a desired diameter or adjustable to accommodate any desired diameter of tube 28. In the preferred construction, rollers 51 are mounted to frame 50 and positioned for contacting the outer surface of tube 28 as tube 28 is formed and axially extends outwardly from housing 45. By providing supporting rollers, the continuous rotational movement of tube 28, as well as its axial, longitudinal movement away from housing 45 is capable of being easily accommodated.

By employing the present invention, hollow cylindrical tube 28 may be formed in any desired diameter by merely altering the diameter of mandrel 30. By constructing mandrel 30 with an outer diameter substantially equivalent to the inside diameter desired for tube 28, the precisely desired inside diameter of tube 28 is attained. As a result, large diameter, hollow cylindrical tubes can be formed quickly and easily, without requiring the use of expensive, sophisticated, specially designed manufacturing equipment.

In addition to employing mandrels of varying diameters in order to attain the desired inside diameter tube dimension, both the thickness and outer diameter of tube 30 is controlled by forming profile 22 with the desired dimensions and thickness. Clearly, by forming profile 22 with the desired thickness as part of the extrusion process being performed by extruder 21, the desired thickness for tube 28 is attained. In addition, as is further detailed below, varying configurations and cross-sectional shapes are also produced by extruder 21 in order to attain specially constructed tube configurations.

In addition to producing hollow cylindrical tubes having any desired diameters and thicknesses, the present invention also produces hollow cylindrical tubes having any desired length. As detailed above, profile 22 is continuously received by tube forming machine 24 which continuously bonds the incoming profile 22 to the end of the previously received and bonded convolutions 27 which form tube 28. As a result, hollow cylindrical tube 28 continuously advances axially away from support housing 45 in a manner which allows the formed hollow cylindrical tube 28 to continuously increase in length until cut. In this way, any desired tube lengths can be accommodated easily and efficiently in a cost efficient manner.

In FIG. 1, one embodiment for cutting hollow cylindrical tube 28 to a desired length is depicted. In this embodiment, cutter assembly 54 incorporates a blade housing 55 within which endless cutting blade 56 is maintained and continuously rotated. Finally, in this embodiment, blade housing 55 is mounted to upstanding posts 57 mounted on opposed sides of frame assembly 50.

In employing this embodiment for a tube cutting system, when a desired length of tube 28 has been formed, blade housing 55 is advanced upwardly along support post 57, bringing cutting blade 56 into contact with at least the lower portion of tube 28. Since tube 28 continuously rotates about its central axis, the portion of hollow tube 28 contacting cutting blade 56 changes, thereby enabling cutting blade 56 to effectively cut tube 28 in its entirety to attain the desired length. As shown in FIG. 1, once the desired length of tube 28 is attained, it can be transported on a conveyor system to any desired location, enabling the next length of hollow cylindrical tube 28 to be formed and cut in a similar manner.

Figure 6:
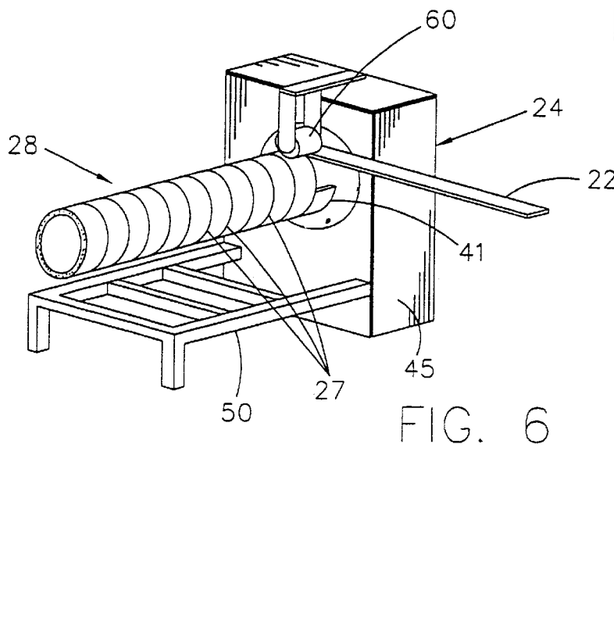
FIG. 6 is a perspective view of the rotating cylindrical mandrel of FIG. 5 depicted in the process of forming a hollow tube member thereon.

A further element that may be incorporated onto tube forming machine 24 if desired is an alignment roller 60, depicted in FIG. 6. If employed, alignment roller 60 is mounted to support housing 45 in direct association with the position where profile 22 is securely bonded to previously wound convolution 27. By employing alignment roller 60, which preferably comprises an overall length greater than the width of profile 22, assurance is provided that incoming profile 22 is bonded to the previously received convolution 27 in a substantially continuous, smooth, planar configuration. In this way, the outer surface of tube 28 is maintained with a substantially continuous, smooth, outer surface integrally formed therewith.

As detailed above, product forming system 20 of the present invention enables the efficient production of hollow cylindrical tubes 28 with virtually any desired diameter and wall thickness, without requiring the use of costly, specially designed manufacturing equipment. As a result, a substantial advance in the formation of large diameter cylindrical tubes is attained.

Figures 7, 7A, 8:
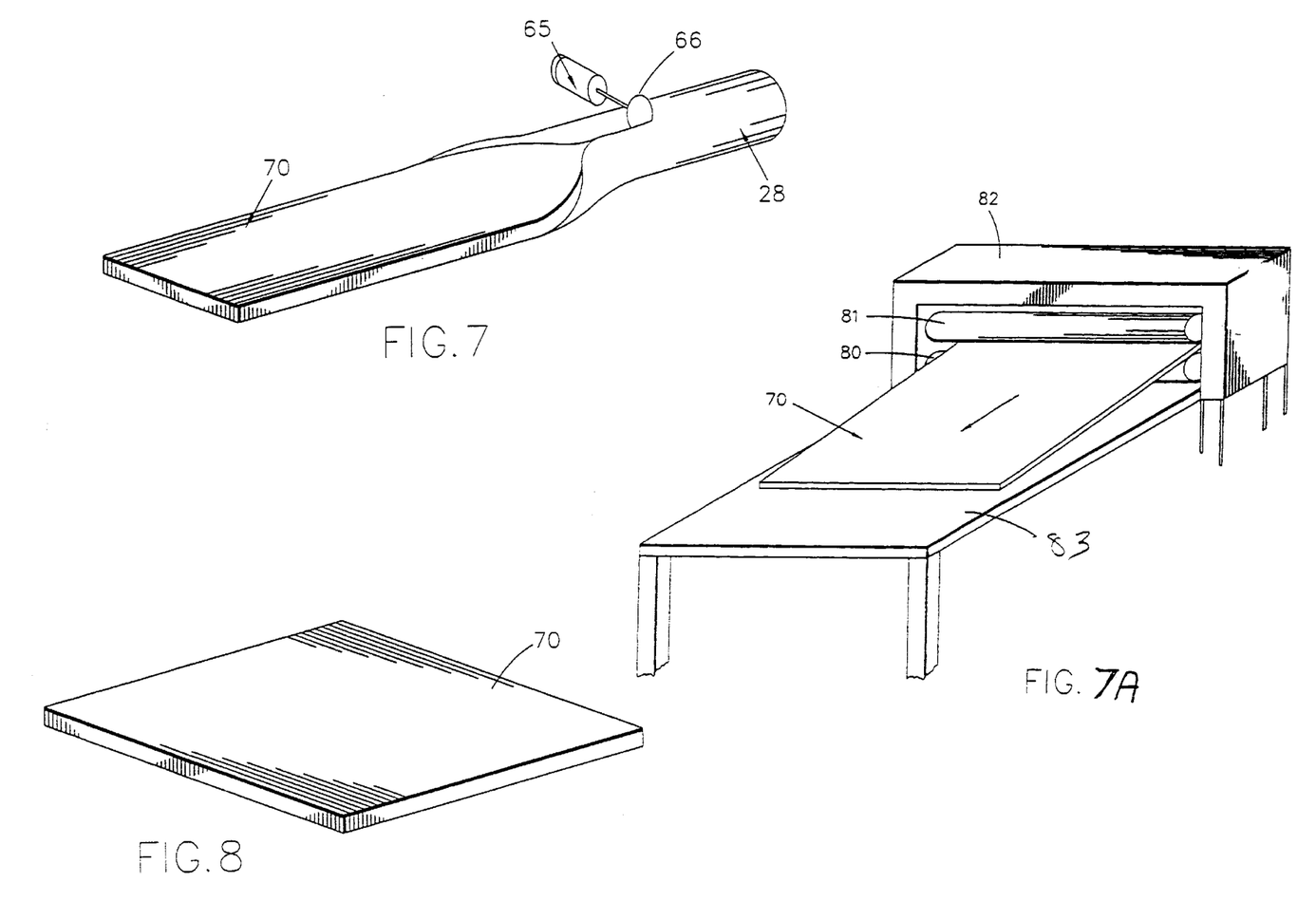
FIG. 7 is a perspective view of a hollow cylindrical tube member formed in accordance with the present invention in the process of being slit to form a substantially flat sheet or plank.
FIG. 7A is a perspective view of a roller system.
FIG. 8 is a perspective view of a substantially flat thermoplastic foam sheet or plank formed in accordance with the present invention.

In addition to the substantial advance and unique discovery in the production of large diameter, hollow cylindrical foam tubes, the present invention also achieves the equally efficient production of large width planks or sheets of thermoplastic foam material in virtually any desired thickness. As shown in FIG. 7, a substantially flat plank or sheet of the foam thermoplastic material is easily attained from the formed hollow cylindrical tube by employing cutter means 65.

In order to attain a substantially flat sheet or plank of foam thermoplastic material 70, cutter means 65 with circular cutting blade 66 is mounted and supported in the generally conventional manner for longitudinally cutting through the wall of hollow cylindrical tube 28. As tube 28 is longitudinally cut in the manner depicted in FIG. 7, the thermoplastic material forming tube 28 is allowed to spread outwardly, forming a substantially flat plank or sheet 70 of thermoplastic material. If the length of tube 28 does not correspond to the length desired for sheet/plank 70, sheet/plank 70 is merely cut to the desired length to obtain sheet/plank 70 depicted in FIG. 8.

As is apparent from the preceding disclosure, sheet/plank 70 is constructed with any desired width by merely forming hollow cylindrical tube 28 with a diameter, or circumference, which will produce the desired width when tube 28 is longitudinally split and formed into sheet/plank 70. In addition, any desired thickness sought for sheet/plank 70 is easily achieved by forming profile 22 with the precisely desired thickness. As a result, by employing the present invention, sheet/plank 70 is constructed in any width and thickness in a single production step, thereby eliminating the necessity for using expensive, specially designed manufacturing equipment as well as employing numerous repetitive steps required for constructing products having a thickness greater than ½".

The transition or transformation of the thermoplastic material from hollow cylindrical tube 28 to substantially flat, planar, sheet/plank 70 depends upon the temperature of the profile 22 during the formation of tube 28 as well as the temperature of the plastic material when tube 28 is longitudinally cut. In the preferred operation, cylindrical tube 28 is formed using a heated profile 22, and tube 28 is cut while the thermoplastic foam material retains sufficient heat from the extrusion process. In this way, sheet/plank 70 is formed automatically or easily formed by merely placing the sheet/plank 70 in a flat configuration and allowing sheet/plank 70 to cool in that configuration.

If desired, a roller system as depicted in FIG. 7A may be employed. As shown therein, rollers 80 and 81 are mounted in housing 82 and are interconnected with drive means (not shown) which are connected to rotational drive rollers 80 and 81 in opposite directions. In the preferred constructions, rollers 80 and 81 are rotationally driven to enable sheet/plank 70 to be received by rollers 80 and 81 and automatically advanced between the rollers by the rotational movement thereof. In addition, sheet/plank 70 is advanced away from rollers 80 and 81 by the action of roller 80 with support table 83, after being wrapped about roller 80.

In those instances in which sheet/plank 70 incorporates a residual curved shape due to its formation from a cylindrical shaped tube, the roller system depicted in FIG. 7A may be employed in order to eliminate the residual curve. By feeding the sheet/plank 70 between rollers 70 and 81 and causing sheet/plank 70 to be wrapped about roller and emerge from roller 80 on table 83, the residual curve incorporated into sheet/plank 70 is eliminated by counteracting this residual curve with the curved wrapping of sheet/plank 70 about roller 80. By employing this roller system, any residual curve in sheet/plank 70 is quickly and easily eliminated, producing sheet/plank 70 with any desired dimensions in the precisely desired flat configuration.

In alternate production situations, namely where tube 28 is formed using heated profile 22 but allowed to cool prior to cutting or in situations where profile 22 has cooled prior to the formation tube 28, some residual curvature may remain after tube 28 has been longitudinally slit. However, in any such situation, the curved sheet or plank is merely placed in a heated chamber in a manner which enables sheet/plank 70 to be formed into a substantially flat configuration. Once sheet/plank 70 has been formed into a substantially flat, planar configuration, sheet/plank 70 retains the flat configuration after cooling.

By employing this process, which is typically referred to as thermoforming, sheet/plank 70 may be formed into any desired cross-sectional configuration. As a result, if so desired, sheet 70 can be formed into any desired shape, such as a rectangle and placed in a heated chamber. Once sufficiently heated, the foamed thermoplastic material is removed from the heated chamber and allowed to cool in the newly formed shape. Once cooled, the thermoplastic material remains in the new configuration until reheated and placed in a new configuration.

Many foam products are formed with a plurality of separate and distinct layers in order to attain a final product that is capable of satisfying specific conditions required by the user. Examples of such products include hollow cylindrical foam tubes laminated with an external jacket for durability or weather protection; foam tubes incorporating an elongated longitudinal slit in combination with pressure sensitive adhesive for closing the slit after installation; foam tubes laminated with an internal jacket for elevated temperature protection or moisture protection; foam sheets laminated with specialty adhesives and/or protective liners; foam sheets or profiles laminated with materials of different colors; and foam tubes coextruded with dissimilar materials, such as wiring, in order to enhance structural properties.

Although prior art conventional production techniques are capable of efficiently producing foam profiles and sheets having multiple layers for such purposes, as detailed above, the capability of producing similar products in tube form with large diameters is extremely costly. Similarly, the production of thermoplastic material in large sheets with a plurality of layers is also extremely difficult and costly to produce. However, by employing the present invention, these prior art difficulties and inabilities are eliminated and a highly competitive, cost efficient, sophisticated production system is attained for producing multilayer hollow cylindrical tubes and sheets or planks in flat form or any desired shape or configuration.

Figure 9:
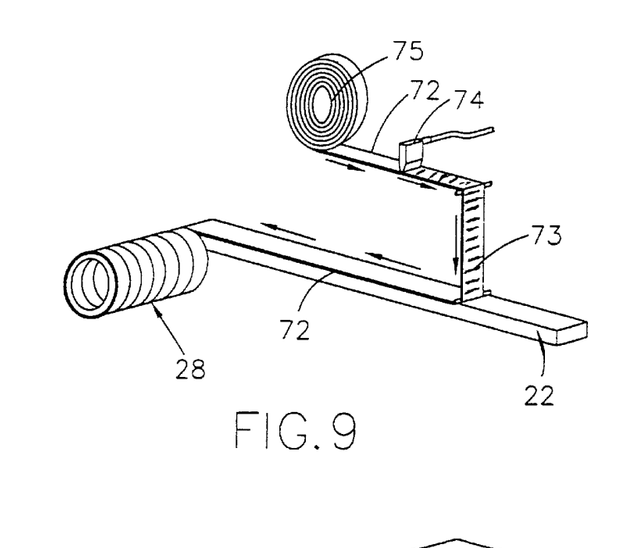
FIG. 9 is a perspective view diagrammatically depicting the formation of a hollow cylindrical tube in accordance with the process of the present invention wherein a second layer of material is affixed to the extruded foamed layer prior to formation of the cylindrical tube.

By referring to FIG. 9, one method for applying a second layer to profile 22 is diagrammatically depicted. In this embodiment, although not shown, tube 28 is produced using tube forming machine 24 detailed above. In this exemplary process, second layer 72 is securely affixed to thermoplastic foam profile 22 by adhesive means 73. As depicted, adhesive applying head 74 is positioned in cooperating relationship with second layer 72 applying adhesive 73 to one surface thereof as layer 72 is withdrawn from layer roll 75.

As adhesive means 73 is applied to one surface of layer 72, the adhesive bearing layer is applied directly to one surface of profile 22, securely bonding and affixing layer 72 to profile 22. As is apparent to one of ordinary skill in the art, a plurality of alternate construction methods and layers may be employed for affixing a second layer 72 to profile 22. The method shown in FIG. 9 is employed merely for exemplary purposes only and is not intended in any way to limit the present invention, since numerous alternate methods can be used without departing from the scope of this invention.

Once layer 72 is securely affixed to profile 22, the dual layer component is advanced onto tube forming machine 24 in a manner detailed above in order to form hollow cylindrically shaped tube 28 incorporating a foamed inner core with an outer surface comprising second layer 72.

Figure 10:
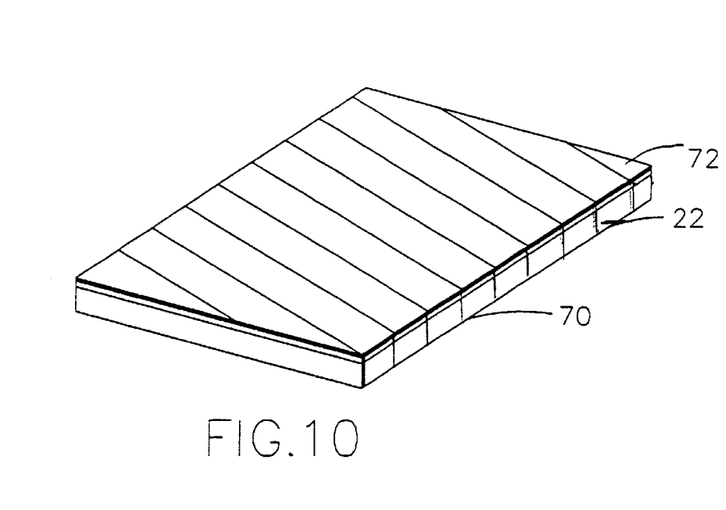
FIG. 10 is a perspective view depicting an enlarged plank or sheet of foam plastic material formed with a second layer affixed thereto.

In FIG. 10, the dual layer material produced in FIG. 9 is depicted as a substantially flat sheet or plank 70. Since the dual layer material is employed as the source material, plank or sheet 70 of FIG. 10 comprises layer 72 intimately bonded to the thermoplastic material comprising profile 22.

Figure 11:
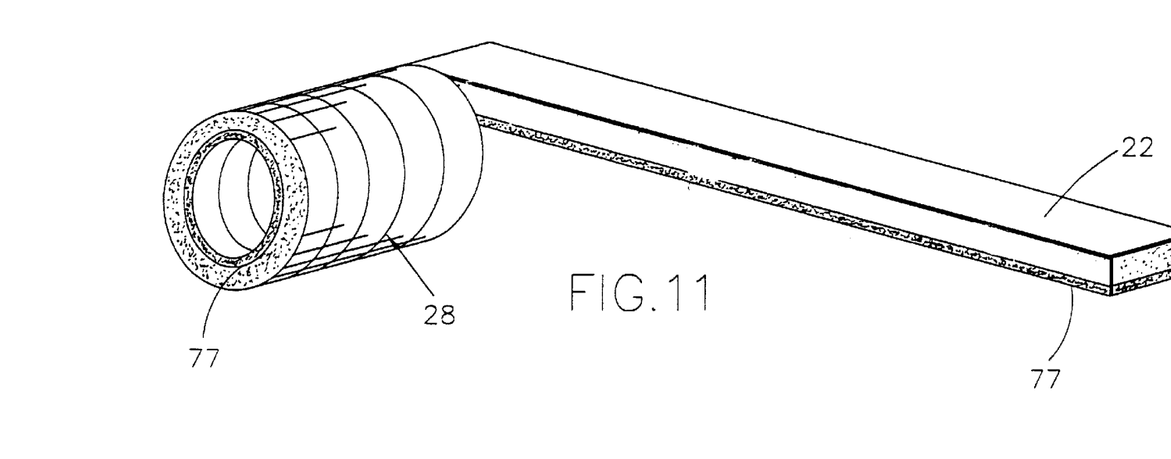
FIG. 11 is a perspective view of a hollow cylindrical tube depicted diagrammatically employing the present invention for forming a dual layer hollow cylindrical member.

In FIG. 11, an alternate construction is diagrammatically depicted for forming a dual layer hollow cylindrical layer 28. In this embodiment, layer 77 of the desired material is securely affixed to the bottom of profile 22 in order to produce hollow cylindrical tube 28 having an inner core comprising layer 77 of the desired material.

As detailed above, this embodiment of tube 28 is formed in the identical manner using tube forming machine 24. By employing this construction, a higher temperature insulation material can be employed for layer 77, thereby providing a cost effective hollow cylindrical tube 28 capable of resisting high temperature in applications where such requirement is necessary. Furthermore, employing this invention, tube 28 can be constructed with this dual layer configuration to attain a tube having any desired diameter and thickness required for a particular application.

In addition to forming hollow cylindrical tube 28 in the manner detailed above as either a single layer of foam thermoplastic material or as a multi-layer product incorporating additional layers of material bonded thereto, both the cylindrical tube and the substantially flat sheet or plank produced by the present invention may be formed in a wide variety of alternate shapes or configurations. In this way, any desired configuration sought for an end product can be attained using the present invention.

Figure 12:
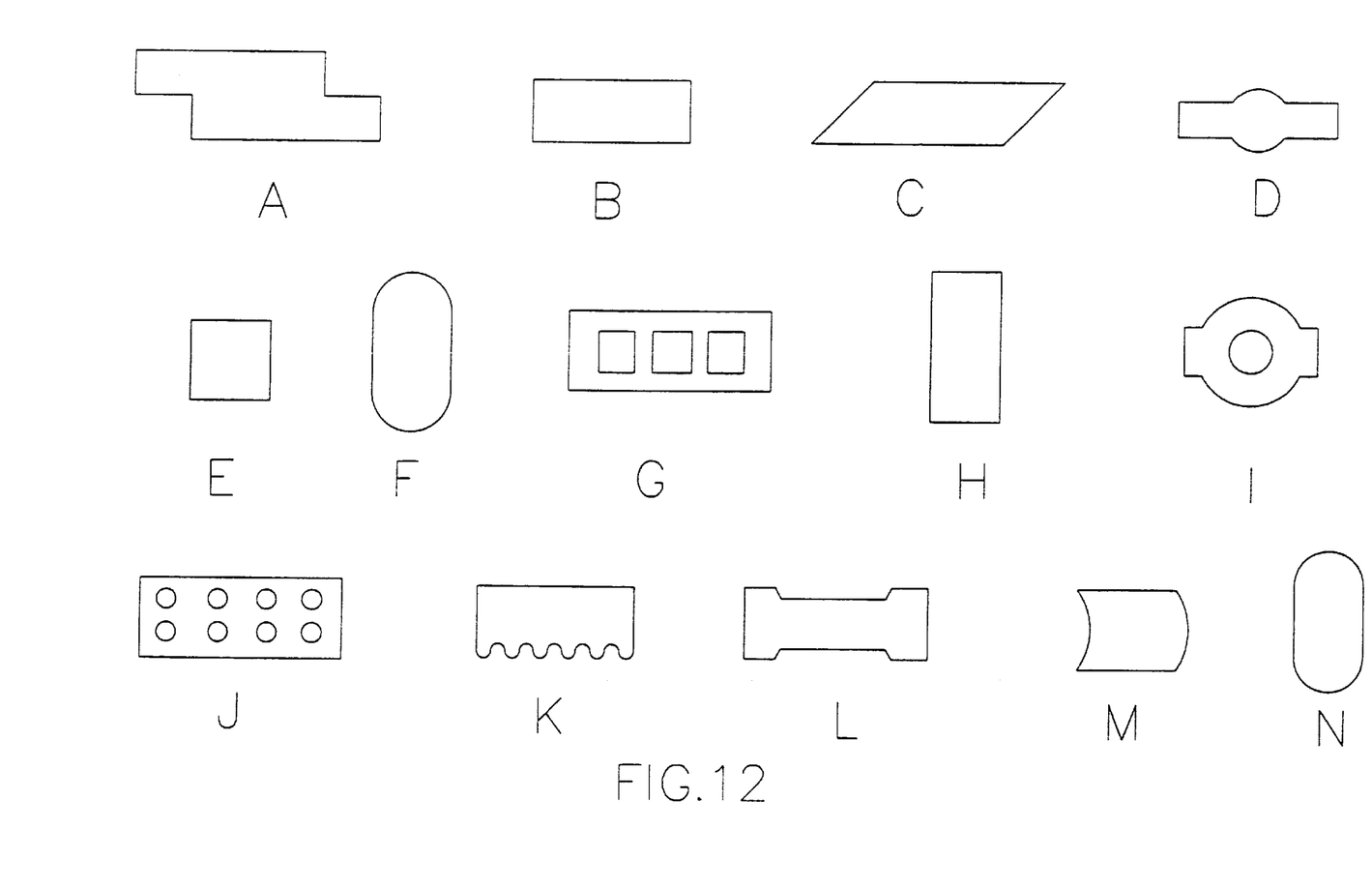
FIG. 12 is a series of fourteen cross-sectional views of alternate configurations of the extruded thermoplastic foam profile.

In FIG. 12, various alternate exemplary shapes are provided representing the cross-sectional shape producible by extrusion machine 21 depicted in FIG. 1. Although these alternate shapes are not exhaustive of the wide variety of cross-sectional configurations and internal cavities capable of being produced using conventional extrusion equipment, the shapes are provided as an example of the various configurations that may be attained. In addition, by employing the present invention, bonded interengagement of the side edges of the adjacent profiles as wound around mandrel 30 enables the wide variety of end product configurations to be attained.

For example, the cross-section depicted in cross-section "A" of FIG. 12 represents an overlying lapped edge for producing a hollow cylindrical tube having an overlapping lapped edge configuration bonding each adjacent convolution thereof. In addition, if desired, a substantially flat sheet or plank can also be produced from the hollow cylindrical tube formed from profile represented by cross-section "A" of FIG. 12.

Cross-sections "G", "I", and "J" are examples of profiles producible with internal cavities. These cross-sectional shapes are merely examples of the wide variety of cross-sectional configurations that can be produced, including the number, position, and shape of the internal cavity. However, cross-sectional profiles of this general configuration are of particular importance in producing substantially flat sheets or planks incorporating longitudinally extending internal cavities.

In order to produce a final product of this nature, a hollow cylindrical tube is produced and longitudinally cut as detailed above. However, in order to assure a longitudinally extending, substantially continuous open zone through the entire sheet or panel, the resulting panel/sheet product would be cut or trimmed at the appropriate angle in order to attain a final configuration wherein each of the profiles forming the sheet or panel are parallel with the side edge, thereby enabling the internal cavity contained therein to be longitudinally extending through the entire sheet or panel. In this way, various products, such as cushioning mats, protectors, liners, floats, etc. are all producible in a highly effective, cost efficient manner.

As is apparent from the foregoing detailed disclosure, the present invention attains a unique manufacturing process, production equipment, and product configurations which have previously been unattainable without requiring the use of expensive production equipment and costly manufacturing steps. However, using the process and equipment detailed herein, products are now produced which have previously been unattainable using prior art technologies. Consequently, although certain examples have been provided as a disclosure of the present invention, it is understood that these examples are merely to teach the overall invention and are not intended to limit the present invention.

It will thus be seen that the objects set forth above, among those made apparent from the preceding description are efficiently attained and, since certain changes may be made in carrying out the above process, and the construction of the equipment detailed above, as well as the resulting produce herein described, without departing from the scope of the invention, it is intended that all matter contained in the above description or shown in the accompanying drawings shall be interpreted as illustrative and not in a limiting sense.

What is claimed is:

1. A method for continuously manufacturing foam thermoplastic products comprising the steps of:

A. continuously extruding a foam thermoplastic member in an elongated, longitudinally extending, substantially continuous length having a desired cross-sectional shape using a fixed, immovable extruder with the cross-sectional shape of the foam thermoplastic member comprising one selected from the group consisting of rectangles, squares, parallelograms, polygons, ellipses, circles, ovals, and combinations thereof;

B. advancing the elongated, longitudinally extending foam thermoplastic member into association with a puller member constructed for continuously drawing the foam thermoplastic member from the extruder and feeding the foam thermoplastic member to forming means having a fixed base and a rotatable mandrel mounted thereto said mandrel comprising a single, longitudinally extending, substantially continuous surface having a substantially uniform cross section through its length;

C. controllably winding the elongated, longitudinally extending, foam thermoplastic member directly on said rotatable mandrel of said forming means in a manner to cause opposed sides of the foam thermoplastic member to be positioned in juxtaposed, side-to-side, adjacent relationship when wound on the rotatable mandrel;

D. continuously bonding the juxtaposed, adjacent side edges of the foam thermoplastic member to each other as the foam member is wound on the rotatable mandrel;

E. continuously forming a substantially cylindrically-shaped foam thermoplastic member which
      a. continuously advances longitudinally along the length of the rotatable mandrel, and
      b. continuously advances beyond a terminating end of the mandrel; and F. repeatedly cutting desired lengths of the cylindrically shaped foam thermoplastic member from the length thereof extending beyond the terminating end of the rotatable mandrel thereby providing hollow foam thermoplastic products having any desired size or shape.

2. The method defined in claim 1, wherein said foam thermoplastic member comprises at least one selected from the group consisting of polystyrenes, polyolefins, polyethylenes, poly- butanes, polybutylenes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, poly- propylene's, and copolymers of polypropylene.

3. The method defined in claim 1, wherein a cross section of the foam thermoplastic member is further defined as being solid.

4. The method defined in claim 1, wherein a cross-section of the foam thermoplastic member is further defined as comprising at least one aperture longitudinally extending through substantially the entire length thereof.

5. The method defined in claim 1, wherein the forming means is further defined as comprising a support member constructed for receiving and controllably winding the elongated longitudinally extending, substantially continuous foam thermoplastic member and for controllably causing a first side surface of the elongated foam thermoplastic member to be brought into juxtaposed, side-to-side relationship with a second side surface thereof.

6. The method defined in claim 5, wherein the support member is further defined as comprising a cylindrically shaped mandrel constructed for continuously rotating about the central axis thereof and positioned for receiving the elongated, longitudinally extending, substantially continuous foam thermoplastic member and enabling the elongated foam thermoplastic member to be continuously wrapped about the surface thereof, producing a cylindrically shaped elongated foam product peripherally surrounding and supportingly maintained thereon.

7. The method defined in claim 6, wherein said cylindrically shaped mandrel is further defined as comprising a circular shape and is removably mounted to rotating support member for enablizing mandrels of different diameters to be employed.

8. The method defined in claim 6, wherein said mandrel is further defined as comprising guide means formed thereon for receiving the elongated, longitudinally extending, continuous foam thermoplastic member and controllably advancing the foam thermoplastic member about the outer surface of the mandrel in a generally spiral configuration, whereby the side surfaces of the thermoplastic member are brought into juxtaposed, contacting relationship with each other.

9. The method defined in claim 8, wherein said bonding step is performed by heating the side surfaces of the elongated, longitudinally extending foam thermoplastic member as the side surfaces thereof are brought into juxtaposed contacting relationship with each other.

10. The method defined in claim 8, wherein the bonding step is performed by applying adhesive means to one side surface of the foam thermoplastic member for causing secure bonding engagement when opposed side surfaces contact each other.

11. The method defined in claim 1, further comprising the step of
   G. cutting the formed hollow foam thermoplastic product in a plane substantially perpendicular to the central axis thereof, thereby providing hollow foam thermoplastic products in a precisely desired length.

12. The method defined in claim 11 and further comprising
   H. supporting the hollow foam thermoplastic product as the product is produced, thereby preventing unwanted distortions of the product.

13. The method defined in claim 11 and further comprising the steps of
   H. longitudinally cutting the hollow foam thermoplastic product along one wall of the formed after said diametric cutting step has been performed; and I. opening said longitudinally cut thermoplastic product into a substantially flat plank member having any desired length and width thereby forming a plank member with any desired dimensions.

14. The method defined in claim 13 and further comprising the step of:
   J. passing the open plank member through roller means for removing any curvature retained therein from the forming process.

15. The method defined in claim 13 and further comprising the steps of:
   placing the open plank member in a heated chamber and allowing the plank to be heated until flat; and
   K. cooling the plank in a flat configuration.

16. The method defined in claim 1 and further comprising the steps of:
   G. applying at least one additional layer of material to a surface of the foam thermoplastic member prior to passage thereof to the forming machine; and
   H. bonding said additional layer to the surface of the foam thermoplastic member, whereby a multi layer hollow product is produced having any desired size and shape.

17. The method defined in claim 16, wherein said bonding step is performed by employing at least one selected from the group consisting of adhesives and heat.

18. A system for manufacturing hollow, substantially cylindrically shaped, elongated foam thermoplastic members in a continuous production operation, said system comprising
   A. a fixed, immovable extruder for producing elongated, substantially continuous lengths of foam thermoplastic members having a desired cross-sectional shape comprising one selected from the group consisting of rectangles, squares, parallelograms, polygons, ellipses, circles, ovals and combinations thereof;
   B. a puller member positioned between the extruder and a forming machine and constructed for drawing the foam member from the extruder and feeding the foam member to the forming machine;
   C. a forming machine comprising a fixed, immovable base and a single, longitudinally, extending, substantially continuous support surface positioned for receiving the elongated, continuous foam thermoplastic member directly from the puller member and continuously winding the thermoplastic member in direct association with the rotatable support surface, whereby a first side surface of the thermoplastic member is brought into juxtaposed, spaced, alignment with a second side surface thereof;
   D. bonding means positioned in direct association with the rotatable support surface of the forming machine and in cooperating relationship with the foam thermoplastic member for bonding the side surfaces of the elongated foam thermoplastic member as the side surfaces are brought into contact with each other, causing the surfaces to be securely affixed together and a substantially cylindrically-shaped foam member to be continuously produced;
   E. said support surface axially extending from said base a fixed length for enabling the cylindrically-shaped foam member to be supported thereby and comprising a substantially uniform cross-section throughout said fixed length; and
   F. cutting means, movably mounted in cooperating relationship with the terminating end of the rotatable support surface and constructed for repeatedly cutting desired lengths of the cylindrically-shaped foam members;

whereby an elongated, hollow shaped foam thermoplastic member is produced having any desired length and any desired hollow shape.

19. The system defined in claim 18, wherein the bonding means is further defined as comprising heating means positioned in cooperating relationship with the forming machine in cooperating relationship with the foam thermoplastic member as the side surfaces thereof are brought into juxtaposed alignment with each other, said heating means being formed from one or more selected group consisting of hot air delivery means and heated surfaces.

20. The system defined in claim 18, wherein said bonding means is further defined as comprising adhesive means.

21. The system defined in claim 18, wherein the support surface of the forming machine is defined as comprising a cylindrical shape for producing elongated foam members having hollow cylindrical shapes, with said cylindrically shaped member being mounted for continuous rotation about its central axis, thereby enabling the foam thermoplastic member to be continuously wound therein.

22. The system defined in claim 21, wherein said system further comprises cam means mounted to the support surface of the forming machine for receiving the elongated foam thermoplastic member from the extruder and guidingly advancing the foam thermoplastic member onto the cylindrically shaped rotating support surface and enabling the first side surface of the foam thermoplastic member to be brought into juxtaposed spaced, aligned relationship with the second side surface thereof.

23. The system defined in claim 18, wherein said system further comprises cutting means for longitudinally slicing the hollow shaped, foam thermoplastic member through at least one wall thereof, thereby producing a substantially flat foam thermoplastic panel.

24. The system defined in claim 18, wherein said system further comprises roller means cooperatively associated with the forming machine for aligning at least one surface of the incoming foam thermoplastic member with the corresponding surface of the previously wound thermoplastic member.

25. The system defined in claim 18, wherein said foam thermoplastic member comprises one selected from the group consisting of polystyrene, polyolefins, polyethylenes, polybutanes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylene's and polypropylene.

26. A method for continuously manufacturing foam thermoplastic products comprising the steps of:
    A. continuously extruding a foam thermoplastic member in an elongated, longitudinally extending, substantially continuous length having a desired cross-sectional shape using a fixed, immovable extruder with the cross-sectional shape of the foam thermoplastic member comprising one selected from the group consisting of rectangles, squares, parallelograms, polygons, ellipses, circles, ovals, and combinations thereof
    B. advancing the elongated, longitudinally extending foam thermoplastic member into association with a puller member constructed for continuously drawing the foam thermoplastic member from the extruder and feeding the foam thermoplastic member to forming means having a fixed base and a rotatable mandrel mounted thereto said mandrel
        a. comprising a single, longitudinally extending, substantially continuous surface having a substantially uniform cross section through its length, and
        b. being removably mounted to said base for enabling mandrels of any desired cross-sectional shape and diameter to be mounted thereto;
    C. controllably winding the elongated, longitudinally extending, foam thermoplastic member directly on said rotatable mandrel of said forming means in a manner to cause opposed sides of the foam thermoplastic member to be positioned in juxtaposed, side-to-side, adjacent relationship when wound on the rotatable mandrel;
    D. continuously bonding the juxtaposed, adjacent side edges of the foam thermoplastic member to each other as the foam member is wound on the rotatable mandrel;
    E. continuously forming a substantially cylindrically-shaped foam thermoplastic member which continuously advances longitudinally along the length of the rotatable mandrel and beyond a terminating end of the mandrel; and
    F. repeatedly cutting desired lengths of the cylindrically shaped foam thermoplastic member from the length thereof extending beyond the terminating end of the rotatable mandrel Thereby providing hollow foam thermoplastic products having any desired size or shape.

27. The method defined in claim 26, wherein said mandrel further comprises a mounting plate mounted at one end of the continuous surface forming said mandrel, the mounting plate being constructed for providing mounted engagement of the mandrel to the forming machine for ease of removal and replacement thereof.

28. A system for manufacturing hollow, substantially cylindrically shaped, elongated foam thermoplastic members in a continuous production operation, said system comprising
    A. a fixed, immovable extruder for producing elongated, substantially continuous lengths of foam thermoplastic members having a desired cross-sectional shape comprising one selected from the group consisting of rectangles, squares, parallelograms, polygons, ellipses, circles, ovals and combinations thereof;
    B. a puller member positioned between the extruder and a forming machine and constructed for drawing the foam member from the extruder and feeding the foam member to the forming machine;
    C. a forming machine comprising a fixed, immovable base and a single, longitudinally extending, substantially continuous support surface positioned for receiving the elongated, continuous foam thermoplastic member directly from the puller member and continuously winding the thermoplastic member in direct association with the rotatable support surface, whereby a first side surface of the thermoplastic member is brought into juxtaposed, spaced, alignment with a second side surface thereof;
    D. bonding means positioned in direct association with the rotatable support surface of the forming machine and in cooperating relationship with the foam thermoplastic member for bonding the side surfaces of the elongated foam thermoplastic member as the side surfaces are brought into contact with each other, causing the surfaces to be securely affixed together and a substantially cylindrically-shaped foam member to be continuously produced;

E. said support surface axially extending from said base a fixed length for enabling the cylindrically-shaped foam member to be supported thereby and
 a. comprising a substantially uniform cross-section throughout said fixed length,
 b. being removably mounted to said base for enabling support surfaces of varying sizes and shapes to be easily mounted to said base; and
F. cutting means, movably mounted in cooperating relationship with the terminating end of the rotatable support surface and constructed for repeatedly cutting desired lengths of the cylindrically-shaped foam members;

whereby an elongated, hollow shaped foam thermoplastic member is produced having any desired length and any desired hollow shape.

29. The system defined in claim 28, wherein the support surface of the foaming machine further comprises a mounting plate mounted at one end thereof, constructed for removable mounted engagement with the fixed base of said forming machine for enabling ease of removal and replacement thereof.

* * * * *